May 4, 1965 R. B. EDMONSON 3,181,363
CALORIMETRIC TEMPERATURE MEASURING DEVICE
Filed Jan. 25, 1963 2 Sheets-Sheet 1

FIG.—1

INVENTOR.
ROBERT B. EDMONSON
BY
ATTORNEY

United States Patent Office 3,181,363
Patented May 4, 1965

3,181,363
CALORIMETRIC TEMPERATURE MEASURING DEVICE
Robert B. Edmonson, Upland, Calif., assignor to Aerojet-General Corporation, Azusa, Calif., a corporation of Ohio
Filed Jan. 25, 1963, Ser. No. 253,954
4 Claims. (Cl. 73—339)

The present invention relates generally to temperature measurement and more particularly to measurement of temperature in regions above that which is measurable with conventional thermometers and thermocouples.

The common level of technology in fields of nuclear energy and missile and space development frequently encounters applications involving extremely high gas temperatures well beyond the operating range of standard thermocouple techniques. The problem of accurately measuring such temperatures has been partially solved through the application of water cooled calorimeters, however, obvious limitations of such measuring are primarily in time and accuracy of the calculations of heat transfer to the calorimeter. Therefore, a device which will give the hot gas temperature without such transfer calculation and possibility of errors introduced thereby is much desired and needed in the field of high temperature fluid measurement.

The disadvantage of the cooled calorimeter as well as the great advantages to be realized by the simple dilution techniques in the present invention, which is capable of determining temperatures well beyond the range of existing thermometers or thermocouples, will be readily apparent from an understanding of the device described herein.

The present invention not only overcomes disadvantages of prior devices for high temperature measurement, but permits measurement of temperatures of gases containing small discrete particles at temperatures above 4000° F. A device providing readings at such temperatures has exceptional utility in the development of nuclear ram-jets as well as in the field of nuclear rockets and other propulsion systems such as solid propellant rockets where high temperature gases containing solid particles are present. The present method of measuring temperature by pneumatic temperature probes is of no utility for measuring the temperature of gases containing particulate matter since entrance nozzle erosion or plugging negates the measurements.

The present invention has extremely important utility in the probing of high temperature gases in the fields of rockets, ram-jets, nuclear engines, and other propulsion systems and devices. The present device operates independently of radiation and consequently has utility in the area where present thermocouples are used to measure high temperatures. The device of the present invention may also be used in connection with a "dirty" gas, since foreign deposits on its first or entrance orifice do not invalidate its usage.

Accordingly, it is an object of the present invention to provide a device for the direct measurement of the temperature of gases at extremely high temperatures.

It is another object of the present invention to provide a sonic or critical flow calorimetric temperature measuring device wherein temperature is obtained with a device having no moving parts.

It is a further object of this invention to provide a sonic or critical flow calorimetric temperature measuring and control device which is adaptable to use as a control and feedback mechanism for controlling power inputs to any propulsion device.

Other objects and many of the attendant advantages of this invention will be readily appreciated as the same becomes better understood by reference to the following detailed description when considered in connection with the accompanying drawings wherein.

The device of the present invention may be termed a triple sonic-orifice pneumatic device wherein diluent cooling gas is introduced at a known pressure and temperature into a well-insulated stilling chamber, and which gas flows simultaneously to the flow of high temperature gas of unknown temperature but known pressure into the same chamber. Both gases are introduced through separate sonic nozzles under critical flow conditions, the unknown gas being introduced through a pressure isolation device whose diameter or area may be changed within tolerable limits. The combined gases are then conducted to a third sonic nozzle which is both a pressure isolation and flow rate device, the method of temperature determination being adaptable to multi-component gases and requiring only knowledge of composition and the enthalpy-pressure-temperature relationships of the gases.

Figure 1:
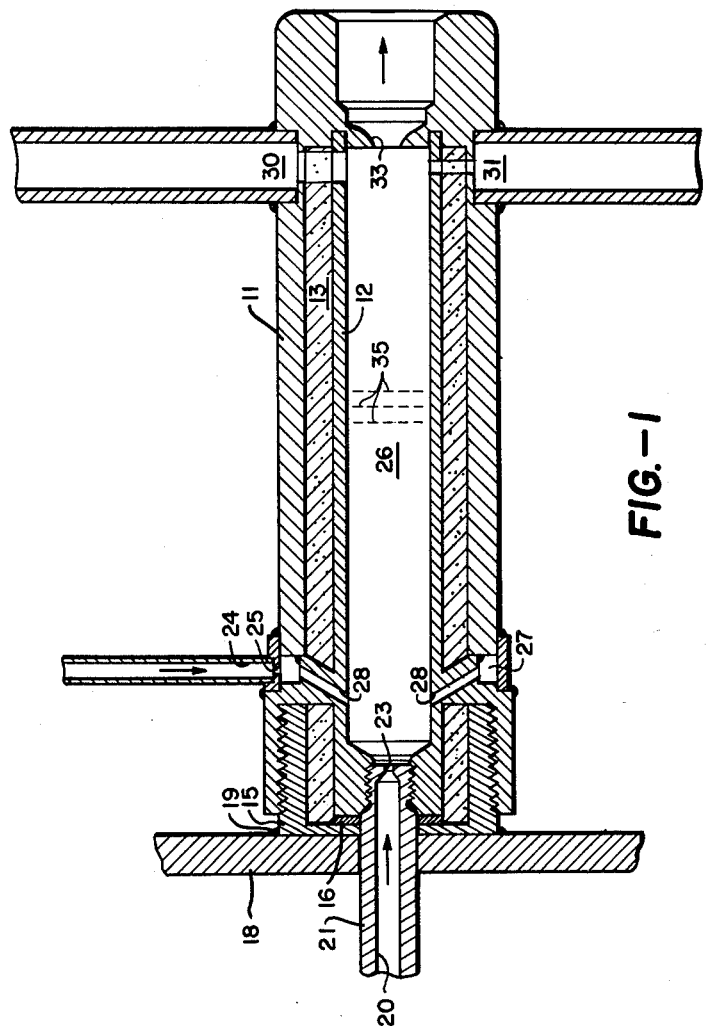
FIG. 1 is a sectional view of one embodiment of the invention.

Referring now to FIG. 1, outer housing 11 is shown positioned in spaced relation with inner housing 12, the two housings being separated as indicated by insulation 13. Outer housing 11 is attached to mounting boss 15 by such means as a threaded or pressure fitting, while inner housing 12 is insulated from the mounting boss as indicated by sealant gasket 16. The mounting boss 15 is in turn mounted on the chamber wall 18 and may be welded thereto as shown at 19 or otherwise attached. Hot gases whose temperature is to be determined are introduced through a passage 20 in fitting 21 having a sonic nozzle 23. The fitting or sampling probe 21 may be of carbon or tungsten or other material capable of withstanding extremely high temperatures. The diluent gas is introduced through passage 24 and sonic nozzle 25 into manifold 27 and thereafter into the stilling and mixing chamber 26 within inner housing 12 through a plurality of inlets 28. Inlets 28 are inclined or directed at an obtuse angle to the direction of flow of the hot gases through sonic nozzle 23. It will be appreciated, however, that although a desirable mixing of gases is effected by such direction of the diluent gas, the diluent gas may be directed otherwise into the stilling chamber within the scope of the invention.

At the end of the chamber remote from nozzle 23 are positioned at least two taps extending transversely through the inner housing, tap 30 providing an area for thermocouple measurement of the temperature of the combined gases, while tap 31 provides for pressure measurement of the gases. Sonic nozzle 33 is located along the chamber spaced with respect to the path of introduction of hot gases but conveniently at the end of the plenum chamber remote from where the gases are introduced, and is inserted to provide for measurement of the mass flow rate of the gases exiting the chamber. It is not a requirement of the invention that nozzles 23 and 33 be axially aligned as shown in the drawings. Intermediate nozzles 23 and 33 fluid mixing means indicated at 35 may be positioned in chamber 26 to effect optimum intermixture of the hot gases and diluent gases. Mixing means 35 may be screens, baffles, ducts, and other such devices to increase intermixture. However, the mixing means may also be omitted within the scope of the invention.

In the following example describing the operation, hydrogen is used as both the gas whose high temperature is to be measured and also the diluent gas whose mass flow rate, temperature, and pressure are known, the temperature, pressure, and mass flow rate of the hot gas being designated as $T_1$, $P_1$, and $\dot{M}_1$, while the same characteristics of diluent gas are indicated by $\dot{M}_2$, $P_2$, and $T_2$. Since hydrogen is assumed as both the sample and the diluent gas in this example, the device for such common gas depends in operation upon the ability to make an analytical calculation of final temperature $T_2$ of the mass of gas $M_1$ with initial-state variables $T_1$ and $P_1$ and final state variables $T_3$ and $P_3$-where the enthalpy change from state 1 to state 3 is known or measured. At the end of the plenum chamber 26 remote from nozzle 23, the mass flow rate, temperature and pressure are determined and designated as $\dot{M}_3$, $T_3$, and $P_3$, with sonic nozzle 33 measuring the mass flow rate $\dot{M}_3$, the thermocouple at tap 30 measuring $T_3$ and a pressure measuring device at tap 31 for measuring $P_3$.

Where hydrogen at a known pressure $P_1$ and an unknown temperature $T_1$ is to be sampled by passage under critical flow conditions through sonic nozzle 23, since the temperature of the hydrogen is unknown the degree of dissociation is also unknown, and such thermodynamic variables as the ratio of the specific heats and the molecular weight of the mixture of diatomic and atomic hydrogen cannot be fixed. Diluent hydrogen at known temperature and pressure simultaneously flows sonically through critical nozzle 25 having known effective area $C_2A_2$, where $C_2$ is an experimentally determined flow coefficient and $A_2$ the measured orifice area. The mass rate of flow is given by the equation:

$$\dot{M}_2 = \frac{C_2 A_2 P_2}{T_2^{1/2}} \left(\frac{Mg}{R}\right)^{1/2} \left(\frac{2\gamma_2}{\gamma_2+1}\right)^{1/2} \left(\frac{2}{\gamma^2+1}\right)^{\frac{1}{\gamma-1}}$$

or $$\dot{M}_2 = \frac{C_2 A_2 P_2}{(T_2)^{1/2}} F(\gamma_2) \quad (1)$$

where $\gamma_2$ represents the known specific heat ratio of the diluent gas $T_2$. $F(\gamma_2)$ is a known function of this ratio and the molecular weight, see, for example, Aerodynamics of a Compressible Fluid, Hans Liepmann, and Allen Puckett, 1947, pages 32 and 33.

This diluent gas cools the incoming gas of mass flow rate $\dot{M}_1$, so that the outlet mass flow rate of gas, $\dot{M}_1 + \dot{M}_2 = \dot{M}_3$, is at a measurable temperature $T_3$ and at a measurable pressure $P_3$. Now let the mass flow $\dot{M}_3$ of gas be passed through the sonic nozzle 33 with effective throat area $C_3A_3$ and at temperature $T_3$ which must be sufficiently low so that negligible dissociation exists. Therefore, the outlet flow rate is given by:

$$\dot{M}_3 = \frac{C_3 A_3 P_3}{(T_3)^{1/2}} F(\gamma_3) \quad (2)$$

Whereas in this particular example the diluent gas is chemically identical to the gas exiting at nozzle 33, it is not a general requirement that $F(\gamma_2) = F(\gamma_3)$.

Mass flow $\dot{M}_3$ is given by:

$$\dot{M}_3 = \frac{C_3 A_3 P_3}{T_3^{1/2}} \left[ \left(\frac{2\gamma_3}{\gamma_3+1}\right)^{1/2} \frac{(2)^{\frac{1}{\gamma_3-1}}}{(\gamma_3+1)} \left(\frac{M_3 g}{R}\right)^{1/2} \right]$$

where $\dot{M}$=mass rate of flow in pounds/second
$C_3 A_3$=effective throat area in square inches
$\gamma$=ratio of specific heats
$M$=molecular weight
$g$=conversion constant
$R$=Universal gas constant It is noted that if $\dot{M}$ were in slugs/sec. formulae would have $$\left(\frac{M_3}{R}\right)^{1/2}$$

instead of $$\left(\frac{M_3 g}{R}\right)^{1/2}$$

Since $\dot{M}_2$ is known from Equation 1 and $\dot{M}_3$ from Equation 2 and $\dot{M}_1 + \dot{M}_2 = \dot{M}_3$ then $\dot{M}_1$ can be determined. Since it is possible to well insulate the stilling chamber 26, the enthalpy change in mixing with the gas is equal to the enthalpy change in the mass of gas going from condition $T_2$, $P_2$ to condition $T_3$, $P_3$. Since the enthalpy of the gas can be obtained by enthalpy-pressure-temperature calculations the enthalpy of the incoming gas under condition 1 can be determined as follows:

If $h_1$=the enthalpy at condition 1 per unit mass
$h_2$=the enthalpy at condition 2 per unit mass
$h_3$=the enthalpy at condition 3 per unit mass
$\Delta h_{2,3} = h_3 - h_2$
$\Delta h_{1,3} = h_1 - h_3$ then $$\Delta h_{2,3} \cdot \dot{M}_2 = h_{1,3} \cdot \dot{M}_1$$

and $$\dot{M}_3 = \dot{M}_1 + \dot{M}_2$$

Therefore $$h_1 = h_3 + \frac{\Delta h_{2,3}}{\dot{M}_3/\dot{M}_2 - 1}$$

or $$h_1 = h_3 + \frac{\Delta h_{2,3}}{\frac{C_3 A_3 P_3}{C_2 A_2 P_2}\left(\frac{T_2}{T_3}\right)^{1/2} - 1}$$

Thus if $P_1$ is measured and $h_1$ is calculated as above then from the enthalpy-pressure-temperature tables or graphs one can determine $T_1$. It is an important feature of the invention that all computations and calculations lend themselves to high-speed computer machine application or operation.

Figure 2:
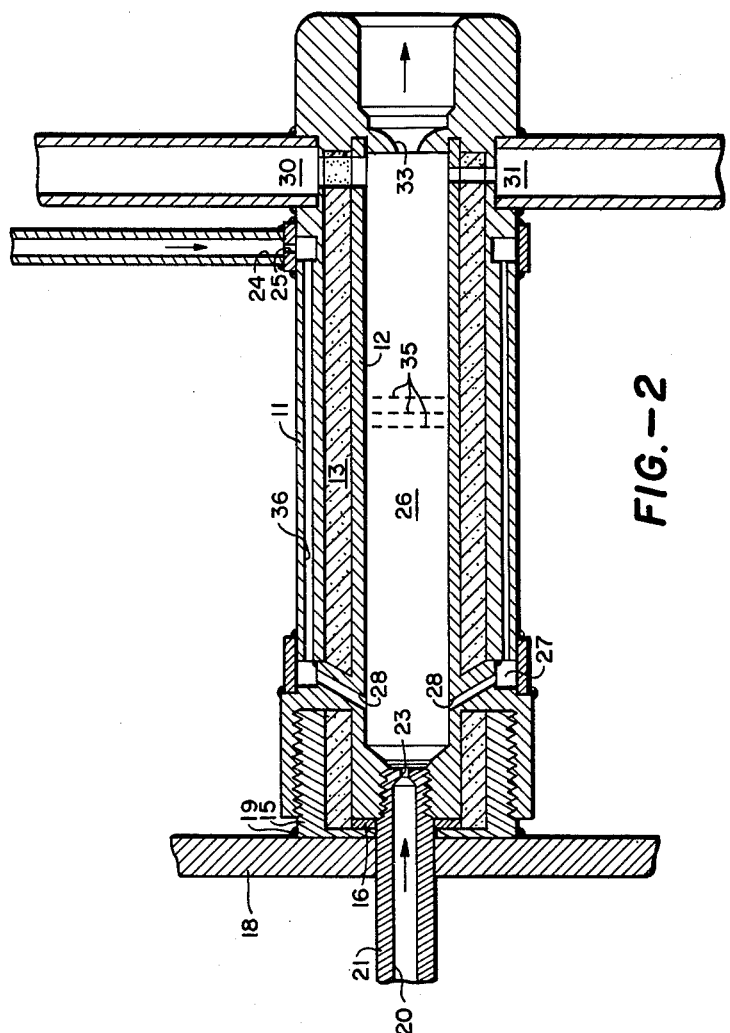
FIG. 2 is a sectional view of an alternate embodiment of the invention.

FIG. 2 illustrates an alternate embodiment of the invention and differs from that of FIG. 1 in that passage 24 is positioned adjacent tap 30 and connected to manifold 27 by conduit means 36. The embodiment of FIG. 2 provides preventive means against escape of any heat traversing insulation 13, or in other words reclaiming heat which may have penetrated insulation 13, by having the diluting gas exiting from nozzle 25 flow through a passage 24, which completely surrounds the insulation, thence into manifold 27.

The use of the dilution probe does not depend on a precise knowledge of the area of the first critical nozzle. This nozzle is used as a pressure isolation device for the probe stilling chamber 26 and consequently diameter or area changes can be tolerated. The second sonic nozzle 25 is both a pressure isolation and flow rate device and obviously can be replaced by any suitable flow measuring instrument. The diluent is open to individual choice and is dependent on the application involved. The probe refractory tube 21 must, of course, be compatible with the gas being sampled and with its temperature.

The method described in the foregoing is adaptable to multi-component gases as well as to single or two-component gases, and any selection of gases may be used so long as the composition and enthalpy-pressure-temperature relationships are known. Where chemical reactions are not involved within the probe, the sampled gas can be handled by any of several conventional methods for a composition analysis. The computation can be done by computers, measurements being taken by pressure and temperature transducers, the outputs of which are fed to appropriate logic circuitry as is well-known in the art.

Obviously many modifications and variations of the present invention are possible in the light of the above

I claim:

1. A sonic flow temperature measuring and control device comprising:

insulated plenum chamber means;

first critical nozzle means for introducing a gas of known mass flow rate and pressure and unknown temperature into said chamber;

second critical nozzle means for introducing a diluent gas of known mass flow rate, temperature and pressure into said chamber adjacent said first critical nozzle means, said second critical nozzle means exiting into a manifold formed in the wall of said chamber means;

a plurality of passages connecting said manifold and said chamber;

exit critical nozzle means in said chamber remote from said first critical nozzle means for determining the mass flow rate of gas from said chamber;

pressure and temperature measuring means in said chamber adjacent said exit critical nozzle means whereby said unknown temperature may be determined from the known enthalpy-pressure-temperature data;

mixing means in said chamber intermediate said first critical nozzle means and said pressure and temperature measuring means for effecting improved intermixture of gases introduced into said chamber; and passage means extending along the outer periphery of the insulated chamber means, said passage means extending from a point adjacent said pressure and temperature measuring means to said manifold whereby said diluent gas may reclaim heat having penetrated through said insulated chamber.

2. A gas temperature measuring device, comprising:

walls defining a chamber;

first means for introducing a gas of known mass rate and pressure and unknown temperature into the chamber while maintaining the gas flow critical;

second means for introducing a second gas of known mass flow rate, temperature and pressure into the chamber to form a mixture with the gas of unknown temperature, the second gas of a temperature significantly less than that of the first gas to effect a cooling thereof;

exit means associated with the chamber and located remotely from the first and second introducing means including means for determining the mass flow rate of the gas mixture from the chamber;

pressure and temperature measuring means mounted adjacent the exit means for measuring the pressure and temperature of the gas mixture in the chamber;

said second introducing means being disposed with respect to the chamber as to reclaim heat escaping from the chamber and add it to the second gas prior to its entry into the chamber.

3. A gas temperature measuring device as in claim 2, in which the second introducing means includes a conduit disposed in continuous contacting relation over an area of the walls defining the chamber.

4. A gas temperature measuring device as in claim 2, in which there are further provided gas mixing means contained within the chamber and located intermediate the exit means and the first and second introducing means.

References Cited by the Examiner

FOREIGN PATENTS 795,238   5/58   Great Britain.

OTHER REFERENCES

"Thermodynamic Temperature Probe" (Thompson and Hines), American Rocket Society Paper No. 1431-60 published Dec. 5-8, 1960.

"Temperature," (Reinhold Publishing Company), vol. 3, Part 2 (1962) page 584.

ISAAC LISANN, *Primary Examiner.*